United States Patent [19]

Iwaki et al.

[11] 4,268,770
[45] May 19, 1981

[54] ALTERNATING CURRENT GENERATOR WITH RADIO NOISE SUPPRESSING CAPACITOR

[75] Inventors: Yoshiyuki Iwaki; Katsuhiko Fujioka, both of Himeji, Japan

[73] Assignee: Mitsubishi Denki Kabushiki Kaisha, Tokyo, Japan

[21] Appl. No.: 71,361

[22] Filed: Aug. 30, 1979

[30] Foreign Application Priority Data

Oct. 4, 1978 [JP] Japan .......................... 53-136949[U]

[51] Int. Cl.³ .............................................. H02K 11/00
[52] U.S. Cl. .................................. 310/72; 310/68 R; 310/68 D; 310/71
[58] Field of Search ................... 310/68 R, 68 D, 71, 310/72, 89, 171

[56] References Cited

U.S. PATENT DOCUMENTS

| | | | |
|---|---|---|---|
| 2,048,896 | 7/1936 | Spengler | 310/72 UX |
| 2,446,761 | 8/1948 | Harmon | 310/72 UX |
| 2,811,657 | 10/1957 | Mollenberg | 310/72 |
| 3,194,994 | 7/1965 | Latta | 310/68 R |
| 3,267,312 | 8/1966 | Redick et al. | 310/68 R X |
| 3,370,201 | 2/1968 | Ward | 310/68 R X |
| 3,538,362 | 11/1970 | Cheetham et al. | 310/68 D |

FOREIGN PATENT DOCUMENTS 1359598  3/1964  France ........................... 310/72

*Primary Examiner*—Mark O. Budd
*Attorney, Agent, or Firm*—Oblon, Fisher, Spivak, McClelland & Maier

[57] ABSTRACT

An alternating current generator for charging a battery has a radio noise suppressing capacitor. One terminal of the capacitor element is press-contacted with the bottom of a hollow part formed in a bracket and the other terminal of the capacitor element is press-contacted with a conductive member connected to the output terminal of the generator in the holding of the capacitor. The parts can be decreased and the quality can be improved.

3 Claims, 4 Drawing Figures

4,268,770

ALTERNATING CURRENT GENERATOR WITH RADIO NOISE SUPPRESSING CAPACITOR

BACKGROUND OF THE INVENTION

1. Field of the Invention:

The present invention relates to an improved alternating current generator for charging a car battery which comprises a radio noise supressing capacitor.

2. Description of the Prior Arts:

Referring to FIGS. 1, 2 and 3, the conventional alternating current generator for charging a battery will be illustrated.

In FIGS. 1 and 2, the reference number (1) designates an alternating current generator and (2) designates a bracket and a radio noise suppressing capacitor (3) is held in the bracket (2). As shown in FIG. 2, one terminal of the capacitor is connected to the output terminal of the generator and the other terminal of the capacitor is connected to the ground.

As shown in FIG. 3, in the conventional generator, the capacitor element is held in a metallic casing (5) and one terminal of the capacitor element is press-contacted with the metallic casing (5) and the other terminal of the element is press-contacted with a conductive member (6). The inner part of the metallic casing (5) is waterproofed by a water proof packing (not shown). The metallic casing (5) is fixed on the bracket (2) with a screw (8) through a holder (7) which is welded on the metallic casing. The conductive member (6) is connected through an insulator (not shown), conductive members (9), (10) mounted on the bracket (2) to the output terminal of the generator. In the conventional structure, one terminal of the capacitor element held in the metallic casing (5) is press-contacted with the metallic casing and the other terminal is press-contacted with the conductive member (6) which is connected to the output terminal of the generator and is fixed on the generator bracket with the screw through the holder welded on the metallic casing. Accordingly, the structure of the capacitor is complicated and requires many parts and a cost for the preparation of the capacitor and a cost for fitting the capacitor are high and moreover, the holder for supporting the capacitor may be broken by vibration or shock from an engine.

The structure of fixing the metallic casing with the screw is disclosed in U.S. Pat. No. 3,538,362 "Diode-rectified alternating current generator having a built-in transistor voltage regulator".

SUMMARY OF THE INVENTION:

It is an object of the present invention to provide an alternating current generator for charging a battery which comprises a radio noise suppressing capacitor which can be formed with less number of parts and has not a trouble of break of a holdler.

The present invention is to provide an alternating current generator which comprises a radio noise suppressing capacitor wherein one terminal of a capacitor element is press-contacted with a bottom of a hollow part formed on a bracket and the other terminal is press-contacted with a conductive member connected to the output terminal of the generator.

DETAILED DESCRIPTION OF THE PREFERRED EMBODIMENT

The alternating current generator for charging a battery of the present invention will be illustrated.

Figure 1:
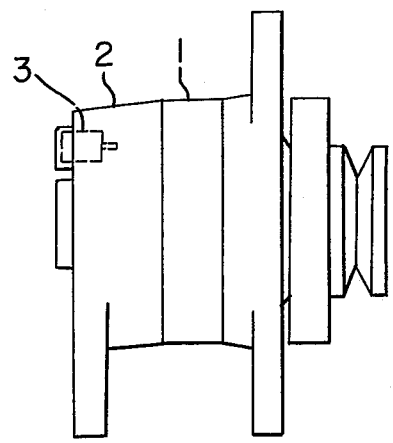
FIG. 1 is a side view of an alternating current generator of the present invention.
Figure 2:
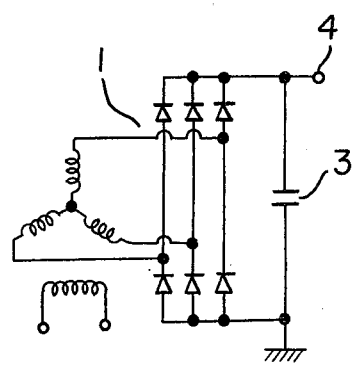
FIG. 2 is a circuit diagram of the alternating current generator shown in FIG. 1.
Figure 3:
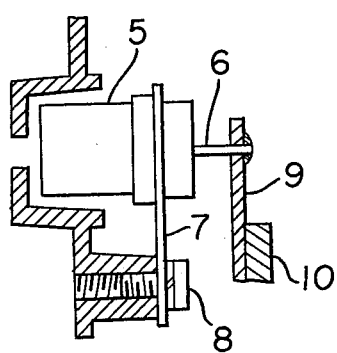
FIG. 3 is a partial sectional view of a conventional capacitor for the generator.
Figure 4:
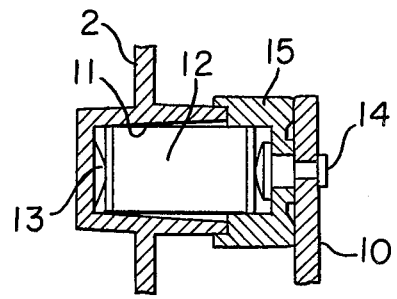
FIG. 4 is a partial sectional view of one embodiment of the capacitor used in the present invention.

In FIG. 4, the reference numeral (11) designates a hollow part formed on the bracket (2); (12) designates a capacitor element held in the hollow part; (13) designates a spring which is held on the bottom of the hollow part (11); one terminal of the capacitor element is press-contacted with the spring (13); (14) designates a conductive member which is press-contacted with the other terminal of the element (12); (15) designates a water proof packing which is fixed by calking on the conductive member (10) which connects the conductive member (14) to the output terminal of the generator. The outer part of the capacitor element (12) is electrically insulated from the bracket (2). The conductive member (10) is fixed through an insulator on the bracket (2) with a screw (not shown). The packing (15) is press-contacted with the bracket (2) when the conductive member (10) is fixed on the bracket (2).

In the structure of the capacitor, the capacitor element (12) is held and fixed in the hollow part formed in the bracket (2) with water proofing. One terminal of the capacitor is electrically connected to the bracket (2) and the other terminal of the capacitor is electrically connected to the output terminal (4) of the generator to suppress the noise current of the generator which is found at the output terminal (4) whereby the radio noise is prevented.

In accordance with the present invention, the metallic casing (5), the holder (7) and the screw (8) can be eliminated from the parts of the conventional apparatus. Since the parts are decreased, the cost of the parts and the cost for the preparation of the capacitor can be reduced and further, the trouble of break of the holder (7) caused by vibration or shock can be prevented.

The above-mentioned embodiment can be modified as follows: The conductive member (10) and the conductive member (14) can be formed in one piece or the spring (13) can be eliminated to result further cost-down by using the packing (15) and the conductive member (10) which have resilience.

In accordance with the present invention, an alternating current generator has a simple structure but has excellent reliability and economical advantages.

We claim:

1. A radio noise surpressor device for use with an AC generator for charging a battery, comprising:
   a bracket, said bracket being a portion of a housing of said AC generator;
   a hollow socket located in a portion of said bracket, said socket including an interior having a truncated conical-shaped inner surface;
   an insulated cylindrical capacitor, said capacitor including a first terminal located at a first end and a second terminal located at second end, said capacitor being positioned in said socket, said first terminal being oriented towards the interior of said socket;

first conductor means positioned between said socket and said first terminal of said capacitor for electrically coupling said first terminal to said socket;
second conductor means positioned between said second terminal of said capacitor and an output terminal of said generator for electrically coupling said second terminal to said output terminal; and
water-proof packing means for mechanically retaining said capacitor in said socket and for preventing water from entering said socket, said packing means surrounding a portion of said capacitor and being located between said second conductor means and an exterior portion of said socket.

2. A radio noise surpressor device as recited in claim 1, wherein said first conductor means comprises:
a spring positioned between said interior of said socket and said first terminal of said capacitor.

3. A radio noise surpressor device as recited in claim 1, wherein said second conductor means comprises:
a first conductive member, said first conductive member contacting said second terminal of said capacitor; and
a second conductive member, said second conductive member coupling said first conductive member and said output terminal of said generator.

* * * * *